United States Patent
Salz et al.

(10) Patent No.: US 6,631,939 B2
(45) Date of Patent: Oct. 14, 2003

(54) ADJUSTABLE VEHICLE ROOF HAVING A PIVOTABLE SIDE WINDOW

(75) Inventors: Wolfram Salz, Vaihingen/Enz (DE); Andreas Hasselgruber, Eberdingen-Nussdorf (DE); Lothar Reiff, Markgroeningen (DE); Thomas Halbweiss, Marbach (DE)

(73) Assignee: CTS Fahrzeug Dachsysteme GmbH, Korntal-Munchingen (DE)

( * ) Notice: Subject to any disclaimer, the term of this patent is extended or adjusted under 35 U.S.C. 154(b) by 0 days.

(21) Appl. No.: 09/925,406

(22) Filed: Aug. 10, 2001

(65) Prior Publication Data

US 2002/0017801 A1 Feb. 14, 2002

(30) Foreign Application Priority Data

Aug. 10, 2000 (DE) .......................... 100 39 853

(51) Int. Cl.[7] ................................. B60J 7/00
(52) U.S. Cl. ................. 296/107.07; 296/117
(58) Field of Search .............. 296/107.01, 108, 296/117, 107.07

(56) References Cited

U.S. PATENT DOCUMENTS

| 2,947,570 | A | * | 8/1960 | Noe |
| 4,784,428 | A | | 11/1988 | Moy et al. |
| 5,029,932 | A | * | 7/1991 | Parr |
| 5,456,516 | A | | 10/1995 | Alexander et al. |
| 5,520,432 | A | | 5/1996 | Gmeiner et al. |
| 6,312,041 | B1 | * | 11/2001 | Queveau et al. |

FOREIGN PATENT DOCUMENTS

| DE | 4320468 | 5/1996 |
| FR | 2706813 | 5/1995 |
| GB | 2279626 | 1/1995 |

OTHER PUBLICATIONS

Search Report, Jun. 2002.

* cited by examiner

Primary Examiner—D. Glenn Dayoan
Assistant Examiner—Scott Carpenter
(74) Attorney, Agent, or Firm—Crowell & Moring LLP

(57) ABSTRACT

A vehicle roof which can be adjusted between a closed position and an opening position has an adjusting device and at least one side window which during the transfer between the closed and opening position can be pivoted via a rotational joint by an actuating element. The actuating element is coupled on one side to the side window at a distance from the side-window rotational axis and is connected on its opposite side to an element of the adjusting device.

10 Claims, 3 Drawing Sheets

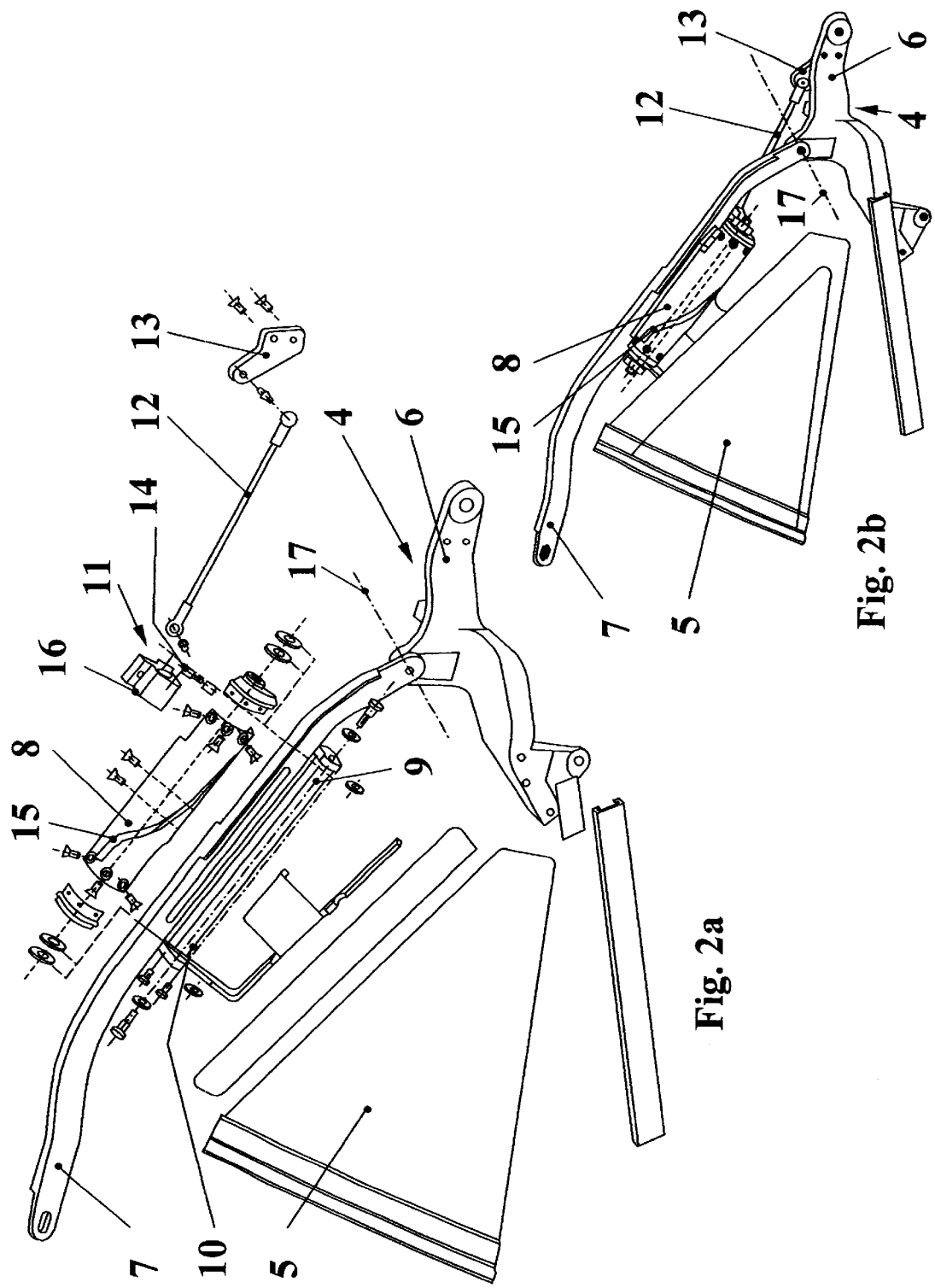

ADJUSTABLE VEHICLE ROOF HAVING A PIVOTABLE SIDE WINDOW

BACKGROUND AND SUMMARY OF THE INVENTION

This application claims the priority of German Patent Application No. 100 39 853.7, filed Aug. 10, 2000, the disclosure of which is expressly incorporated by reference herein.

The present invention relates to an adjustable vehicle roof having a pivotable side window.

DE 43 20 468 C1 discloses a vehicle roof which can be adjusted between a closed position with an opening position with an adjusting device. The roof has a roof part lying at the top and a rear part lying in the rear region, in which case the roof part can be pivoted about a pivot axis on the rear part and the rear part can be pivoted about a further pivot axis on the vehicle bodywork. The movement of the vehicle roof between an opening position and the closed position takes place by way of an adjusting device which acts both on the rear part and on the roof part.

Also, the rear side windows are connected fixedly to the known vehicle roof and, in an opening position of the vehicle roof, are lowered into a storage space. When the roof is transferred from the closed position to the opening position, the kinematically coupled side windows are pivoted about a pivot axis on the vehicle roof and folded in the direction of the vehicle interior. The forced guidance of the side windows takes place by a coupling device which couples the movement of the side windows to the movement of the rear part. The coupling device comprises a plurality of kinematically connected linkage parts via which the pivoting movement of the rear part is converted into a pivoting movement of the side window about a further pivot axis which is not parallel to the rear-part pivot axis.

The coupling of the side-window pivoting movement to the rear-part pivoting movement requires a complicated design of the adjusting device and the coupling device together with a plurality of linkage components requiring a comparatively large amount of space. The plurality of successively connected, interacting components entails the risk of additional, uncontrollable possibilities of movement of the vehicle roof being produced on account of the intrinsic elasticity of said components or on account of play. These movement possibilities may result in undesirable stresses and leakages.

SUMMARY OF THE INVENTION

An object of the present invention is to provide and adjustable roof having a pivotable side window whose adjusting kinematics are distinguished by high precision and a small space requirement.

According to the invention, this object has been achieved by providing that an actuating is coupled on one side to the side window at a distance from the side-window rotational axis and is connected on its opposite side to a component of the adjusting device.

For the transfer of the side window between the closed position and opening position, the vehicle roof in accordance with the invention has an actuating element whose one end is coupled to the side window at a distance from the side-window pivot axis and which is connected on its opposite end fixedly to a component of the adjusting device. In this embodiment, the actuating element which triggers the forced movement of the side window is an integral component part of the adjusting device and is, in particular, connected directly to a component of the adjusting device. Thereby, the kinematic coupling for exerting the pivoting movement of the side window exists only between the side window and the adjusting device of the vehicle roof. In comparison, it is not necessary to couple the pivoting movement of the side window to a pivoting movement of a roof part. Because the components which trigger the pivoting movement of the side window can be assigned to the adjusting device, the side-window kinematics can be designed in a space-saving manner.

A further advantage resides in the fact that the components which are involved in the side-window kinematics also, because they are connected to the adjusting device, only have to bridge correspondingly short distances. As a result, problems with intrinsic elasticity in the linkage parts of the adjusting device can be avoided. The risk of undesirable play is also reduced on account of the small number of components for the side-window kinematics.

The side window has a rotational joint via which the side window is advantageously mounted pivotably on a main link of the adjusting device. Thus, so that during the transfer between the closed and storage position, the side window executes a pivoting movement about two axes with respect to the vehicle bodywork, namely both about the pivot axis of the main link and about the pivot axis of the dedicated rotational joint. This spatial movement of the side window allows the side window to be folded in the direction of the vehicle interior and, at the same time, allows it to be deposited in the rear storage space.

According to one advantageous embodiment, the kinematics of the side window comprise a connecting-link cylinder which forms an integral component together with the rotational joint of the side window and on whose circumferential surface a connecting-link path is formed in which the actuating element which triggers the pivoting of the side window engages in a sliding and positive-locking manner. The chronological sequence of the pivoting movement can be influenced via the connecting-link path. For example, phases of different pivoting speed can be provided during the transition from the closed position into the storage position and vice versa, enabling, in particular, collisions of the diverse, movable components of the vehicle roof to be avoided.

In one currently preferred development, the connecting-link path is formed spirally on the connecting-link cylinder and the movement of the actuating element in the connecting-link path only proceeds in a translational manner with regard to the side window. In this development, the pivoting movement of the side window is caused by the spiral shape of the connecting link, whereas the actuating element acting upon the connecting-link cylinder only executes a translational movement which can be produced in a structurally simple manner.

In a further currently preferred embodiment, the actuating element is a driving link which is coupled in an articulated manner to the side window, in particular to a rotational bearing plate of the side window, and at its end facing away from the side window is held rotatably in a bearing of the adjusting device. The driving link advantageously has just a single movement possibility, namely the rotational movement about its rotational axis on the bearing in the adjusting device. The rotational axis of the driving link expediently does not run parallel to the rotational axis of the side window and the rotational axis of a main link, on which the side window is mounted rotatably. This embodiment permits a kinematically determined movement of the side window, in particular a spatial pivoting movement about a total of two rotational axes with respect to the vehicle bodywork.

The driving link is advantageously connected to the side window via a ball and socket joint. Thereby, when the pivoting movement is executed during the transfer between the closed position and opening position, the longitudinal axis of the driving link can take up a changing angular position with respect to the plane of the side window.

Other objects, advantages and novel features of the present invention will become apparent from the following detailed description of the invention when considered in conjunction with the accompanying drawings.

BRIEF DESCRIPTION OF THE DRAWINGS

FIGS. 2a, 2b are perspective view of a side window including an adjusting device coupled to the vehicle roof, shown respectively in an exploded position and in an assembled position.

DETAILED DESCRIPTION OF THE DRAWINGS

Figure 1A:
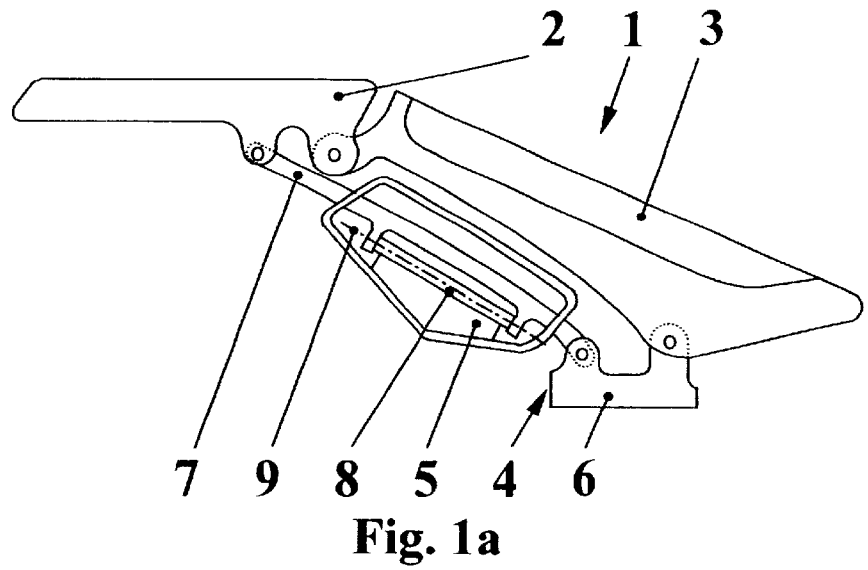
FIGS. 1a to 1c are schematic side view of the vehicle roof comprising an upper roof part and a rear part, illustrated in a respective closed position, an intermediate position and a storage position.
Figure 1B:
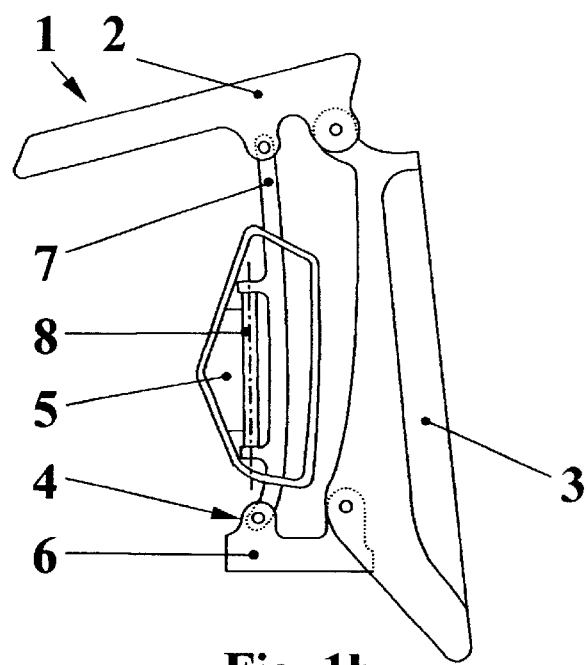
Figure 1C:
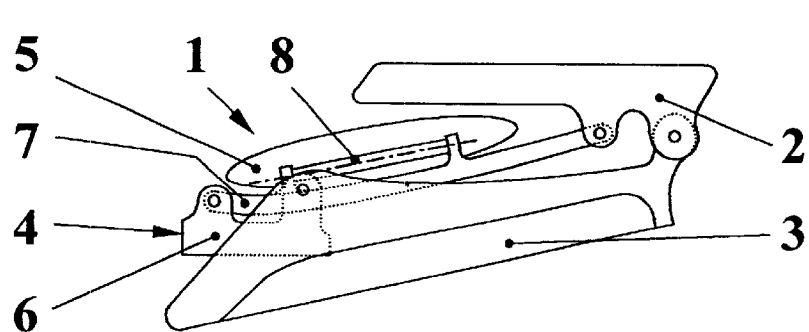

The vehicle roof 1 which is illustrated in the closed position in FIG. 1a is configured as a hard top and includes an upper roof part 2 and a rear-sided rear part 3 which can each be adjusted, by a kinematic adjusting device 4, between the closed position which is shown via the intermediate position which is illustrated in FIG. 1b into the storage position according to FIG. 1c in which the vehicle interior is open and the vehicle roof 1 is stowed in a storage space at the rear end. The adjusting device 4 acts upon both the roof part 2 and the rear part 3. The adjusting device 4 has a main bearing 6 which is expediently fixed on the bodywork and on which the rear part 3 is mounted pivotably, and a main link 7 which is held pivotably and whose end which faces away from the main bearing 6 is connected rotatably to the upper roof part 2. The upper roof part 2 also has a rotational axis with respect to the rear part 3, so that a kinematic four-bar linkage is formed by the main bearing 6, the main link 7, the roof part 2 and the rear part 3.

Mounted rotatably on the main link 7, which is mounted in front of the rear part 3 as seen in the direction of travel of the vehicle, is a rotational joint 8 which is connected in a rotationally fixed manner to the side window 5 and permits a rotational movement of the side window 5 with respect to the main link 7. The rotational axis 9 of the rotational joint 8 runs approximately parallel to the longitudinal axis of the main link 7. The rotational joint 8 and side window 5 are connected fixedly to each other.

As can be seen from FIGS. 2a and 2b, the rotational joint 8 of the side window 5 is mounted on the main link 7 of the adjusting device 4 in a manner such that it can rotate about the rotational axis 9. An axle tube 10 is provided approximately parallel to the longitudinal axis of the main link 7 between two retaining elements of the main link 7 and the rotational joint 8 being seated pivotably, but in a translationally immovable manner, on the axle tube 10. The rotational joint 8 is designed as a connecting-link cylinder whose circumferential surface has a connecting-link path 15 which is wound approximately spirally over the length of the connecting-link cylinder.

The rotational joint 8 is acted upon by an actuating element 11 and forced into rotation about the rotational axis 9. The actuating element 11 has a driver 16 which is in operative connection by way of a connecting-link bolt 14 with the connecting-link path 15 on the rotational joint 8. The driver 16 is arranged in a translationally displaceable manner on the main link 7 and is connected via a connecting rod 12 to a retaining plate 13 which, according to FIG. 2b, is arranged in a rotationally fixed manner on the main bearing 6 of the adjusting device 4.

The main link 7 is mounted pivotably on the main bearing 6. The rotational axis 17 of the main link 7 and the rotational axis 9 of the rotational joint 8 of the side window 5 are arranged in a non-parallel manner with respect to each other, therefore either intersecting or crossing each other. Simultaneous rotation both of the main link 7 and of the rotational joint 8 therefore results in a spatial pivoting movement of the side window 5. In this connection, during the transfer of the vehicle roof from the closed position into the storage position, the side window 5 is both folded in inward in the direction of the vehicle interior and pivoted rearward into the storage position. When the vehicle roof is being closed, the process correspondingly proceeds in the reverse direction.

The side window 5 is coupled to the vehicle roof parts in a kinematically determined manner, so that each position of the vehicle roof 1 can be assigned precisely one position of the side window 5. The movement of the side window 5 is kinematically forcibly guided and is brought about by the exclusively translational sliding movement of the connecting-link bolt 14 of the driver 16 in the connecting-link path 15 in the rotational joint 8 of the side window 5. During the displacement movement of the driver 16 the connecting-link bolt 14 is guided along in the connecting-link path 15.

Because the driver 16 can only be displaced in a translational manner and the connecting-link bolt 14 slides at the same time in a positive-locking manner in the spiral connecting-link path 15, the rotational joint 8 is compelled, on account of the radial distance of the connecting-link path 15 from the rotational axis 9, and correspondingly of the rotational component of the connecting-link path 15, to make a rotational movement about its rotational axis 9, whereupon the side window 5 also executes a pivoting movement. The speed of the pivoting movement can be influenced here by the spiral shape of the connecting-link path 15. It is possible to provide, as seen over the entire opening and closing process, phases of differing rotational speed of the side window.

During the movement transferring the vehicle roof 1 between the closed position and opening position, the main link 7 is pivoted about its rotational axis 17 whereupon the roof parts of the vehicle roof are transferred into their respective, desired position. As can be seen from FIG. 2b, the rotational axis 17 of the main link 7 lies at a distance from the connecting point of the retaining plate 13 of the connecting rod 12 for the driver 16. Therefore, a pivoting movement of the main link 7 about its rotational axis 17 inevitably causes a translational relative displacement of the driver 16 with respect to the main link 7. This relative displacement is used as a triggering movement for the pivoting of the side window.

Figure 3:
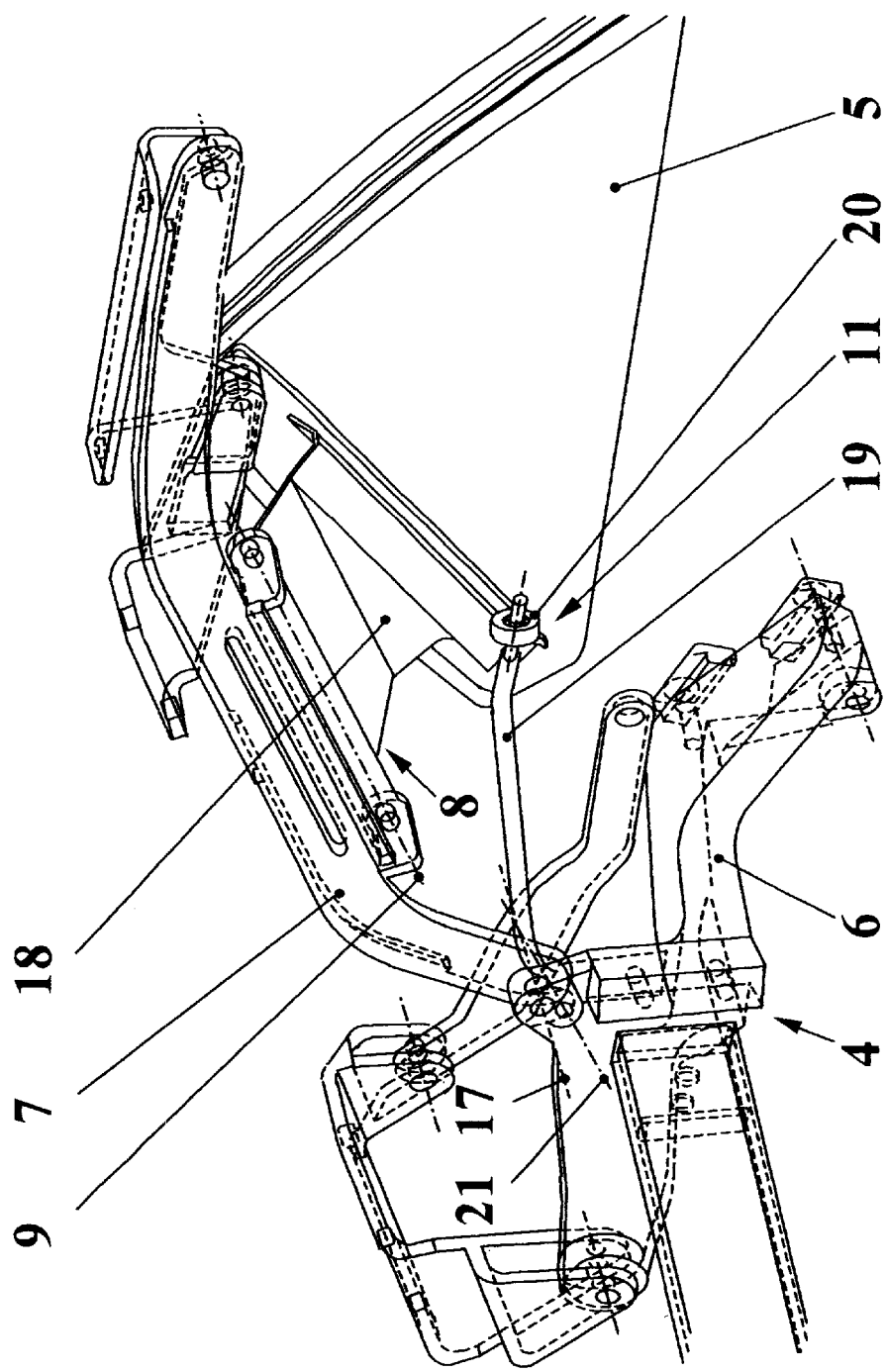
FIG. 3 is a perspective view of a side window including an adjusting device according to a further embodiment.

In the exemplary embodiment according to FIG. 3, the actuating element 11 which acts upon the side window 5 is a driving link 19 which is connected pivotably via a ball and socket joint 20 to a rotational bearing plate 18 of the side window 5. The rotational joint 8 is integrated in the bearing plate 18 which is connected fixedly to the side window 5. The coupling of the driving link 19 to the rotational bearing plate 18 of the side window 5 lies at a distance from the rotational axis 9 of the rotational bearing plate 18 in order to be able to apply a torque pivoting a side window 5 about its rotational axis 9. On its side facing away from the side window 5, the driving link 19 is mounted rotatably on the main bearing 6. The rotational axes 17, 21 of the main link 7 and of the driving link 19, which axes both run in a positionally fixed manner in the main bearing 6, lie in a non-parallel manner with respect to each other. That is, the axes 17, 21 intersect or cross each other. Due to the non-parallel position of the rotational axes 17, 21, the side window 5 executes a pivoting movement about its rotational axis 9 during rotational actuation of the main link 7, since the side window 5 is kinematically forcibly coupled to the rotational movement of the main link 7 via the driving link 19.

The ball and socket joint 20 of the driving link 19 on the rotational bearing plate 18 of the side window 5 advantageously permits a slight translational displacement of the driving link 19 through a ring of the ball and socket joint 20. As a result, dimensional and manufacturing inaccuracies of the adjusting device 4 can be compensated for.

It may be expedient, where appropriate, also to configure the main bearing 6 to pivot with respect to the vehicle bodywork. Instead of, or in addition to, the side window 5, another side part of the vehicle roof, for example a side screen, may also be adjusted kinematically in the above-described manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A vehicle roof adjustable between a closed position and an opening position, comprising an adjusting device configured to act on the vehicle roof and at least one side window pivotally connected to the vehicle roof via a rotational joint pivotable about a rotational axis of the rotational joint by an actuating element during transfer between the closed and opening positions, wherein the actuating element is operatively coupled on one side to the side window at a distance from the rotational axis and is operatively connected on an opposite side thereof to a component of the adjusting device, and the rotational joint of the side window is mounted pivotably on a main link of the adjusting device, which main link is part of a four-bar linkage consisting of the main link, upper and rear parts comprising the vehicle roof and a main bearing.

2. The vehicle roof as claimed in claim 1, wherein the actuating element is a driving link coupled on one side thereof in an articulated manner to the side window and on another side thereof is held rotatably in a bearing of the adjusting device.

3. The vehicle roof as claimed in claim 2, wherein a rotational axis of the driving link on the adjusting device is non-parallel with respect to the rotational axis of the rotational joint of the side window.

4. The vehicle roof as claimed in claim 2, wherein a rotational axis of the driving link on the adjusting device is non-parallel with respect to a rotational axis of the main link of the adjusting device which accommodates the rotational joint of the side window and is held pivotably.

5. The vehicle roof as claimed in claim 2, wherein the driving link is connected to the side window via a ball and socket joint.

6. A vehicle roof adjustable between a closed position and an opening position, comprising an adjusting device configured to act on the vehicle roof and at least one side window pivotally connected to the vehicle roof via a rotational joint pivotable about a rotational axis of the rotational joint by an actuating element during transfer between the closed and opening positions, wherein the actuating element is operatively coupled on one side to the side window at a distance from the rotational axis and is operatively connected on an opposite side thereof to a component of the adjusting device, wherein the actuating element is movable only in a translational manner with regard to the side window.

7. A vehicle roof adjustable between a closed position and an opening position, comprising an adjusting device configured to act on the vehicle roof and at least one side window pivotally connected to the vehicle roof via a rotational joint pivotable about a rotational axis of the rotational joint by an actuating element during transfer between the closed and opening positions, wherein the actuating element is operatively coupled on one side to the side window at a distance from the rotational axis and is operatively connected on an opposite side thereof to a component of the adjusting device, wherein the rotational joint forms, together with a connecting-link cylinder, an integral component having a circumferential surface with a connecting-link path in which the actuating element engages in a positive-locking, sliding manner.

8. The vehicle roof as claimed in claim 7, wherein the connecting-link path is configured as spirally wound.

9. The vehicle roof as claimed in claim 7, wherein the actuating element is a driver movable relative to the side window via a connecting rod.

10. The vehicle roof as claimed in claim 9, the connecting rod is connected to a main bearing of the adjusting device, main bearing being fixed on vehicle bodywork.

* * * * *